(12) United States Patent
Jain (10) Patent No.: US 11,356,321 B2
(45) Date of Patent: Jun. 7, 2022

(54) METHODS AND SYSTEMS FOR RECOVERY OF NETWORK ELEMENTS IN A COMMUNICATION NETWORK

(71) Applicant: SAMSUNG ELECTRONICS CO., LTD., Suwon-si (KR)

(72) Inventor: Prasham Jain, Uttar Pradesh (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/879,079

(22) Filed: May 20, 2020

(65) Prior Publication Data

US 2020/0374180 A1    Nov. 26, 2020

(30) Foreign Application Priority Data

May 20, 2019   (IN) .............................. 201941019922
Mar. 23, 2020  (IN) .............................. 201941019922

(51) Int. Cl.
| | | |
|---|---|---|
| *H04L 12/26* | (2006.01) |
| *H04L 41/0654* | (2022.01) |
| *H04L 41/5009* | (2022.01) |
| *H04L 41/16* | (2022.01) |
| *H04L 41/0604* | (2022.01) |

(52) U.S. Cl.
CPC ...... *H04L 41/0654* (2013.01); *H04L 41/0609* (2013.01); *H04L 41/0672* (2013.01); *H04L 41/16* (2013.01); *H04L 41/5009* (2013.01)

(58) Field of Classification Search
CPC ............ H04L 41/0654; H04L 41/0609; H04L 41/0806; H04L 41/0672; H04L 41/5009
See application file for complete search history.

(56) References Cited

U.S. PATENT DOCUMENTS 7,333,438 B1    2/2008  Rabie et al.
7,573,808 B2    8/2009  Levesque et al.
(Continued)

FOREIGN PATENT DOCUMENTS

| CA | 2 978 447 A1 | 3/2019 |
| KR | 10-2157711 B1 | 9/2020 |
| WO | 2012067910 A1 | 5/2012 |

OTHER PUBLICATIONS

International Search Report (PCT/ISA/210) and Written Opinion (PCT/ISA/237) dated Aug. 26, 2020 issued by the International Searching Authority in International Application No. PCT/KR2020/006577.

(Continued)

*Primary Examiner* — Richard G Keehn
(74) *Attorney, Agent, or Firm* — Sughrue Mion, PLLC (57) ABSTRACT

A method of recovering a plurality of network elements from a network outage, including receiving, at a network management system (NMS), a plurality of recovery requests from the plurality of network elements; determining, by the NMS, a sequence for processing the plurality of recovery requests based on a plurality of priority values associated with the plurality of network elements, wherein a priority value of the plurality of priority values is based on at least one key performance indicator (KPI) associated with a corresponding network element of the plurality of network elements; and recovering the plurality of network elements based on the determined sequence.

17 Claims, 8 Drawing Sheets

(56) References Cited

U.S. PATENT DOCUMENTS

| | | |
|---|---|---|
| 7,590,589 B2 | 9/2009 | Hoffberg |
| 9,392,473 B2 | 7/2016 | Kapnadak et al. |
| 9,674,046 B2 | 6/2017 | Park et al. |
| 9,843,944 B2 | 12/2017 | Zhang et al. |
| 10,050,826 B2 | 8/2018 | Hevizi et al. |
| 10,306,490 B2 | 5/2019 | Ratakonda et al. |
| 2003/0128661 A1 | 7/2003 | Weis |
| 2003/0163557 A1 | 8/2003 | Zollner et al. |
| 2004/0266442 A1 | 12/2004 | Flanagan et al. |
| 2005/0107109 A1 | 5/2005 | Gunaratnam et al. |
| 2007/0121487 A1 | 5/2007 | Klos et al. |
| 2007/0260911 A1* | 11/2007 | Marilly .............. H04L 41/0663 714/4.1 |
| 2008/0219294 A1 | 9/2008 | Landers |
| 2009/0226162 A1 | 9/2009 | Cheng et al. |
| 2011/0122761 A1* | 5/2011 | Sriram ............... H04L 41/0672 370/216 |
| 2013/0039196 A1* | 2/2013 | Bodog ................... H04L 41/00 370/252 |
| 2013/0290775 A1 | 10/2013 | Tucek et al. |
| 2015/0146547 A1* | 5/2015 | Kapnadak ............ H04W 36/30 370/252 |
| 2016/0162346 A1* | 6/2016 | Kushnir ............. G06F 11/0709 714/37 |
| 2016/0295426 A1 | 10/2016 | Gormley et al. |
| 2017/0126476 A1 | 5/2017 | Curtin et al. |
| 2017/0245176 A1 | 8/2017 | Murphy et al. |
| 2017/0353361 A1* | 12/2017 | Chopra ............... H04L 41/5009 |
| 2018/0373578 A1* | 12/2018 | Bridges ................ G06F 11/004 |
| 2019/0149977 A1* | 5/2019 | Seenappa ........... H04L 41/0654 370/331 |
| 2020/0007666 A1 | 1/2020 | Amin et al. |
| 2020/0037390 A1* | 1/2020 | Axen .................. H04L 41/0654 |
| 2020/0213202 A1* | 7/2020 | Soundrarajan ...... H04L 41/5009 |

OTHER PUBLICATIONS

Communication dated Jun. 26, 2021, issued by the India Intellectual Property Office in Indian Patent Application No. 201941019922.
Communication dated Oct. 21, 2021, from the European Patent Office in European Application No. 20810373.9.
Novella Bartolini et al., "Network recovery after massive failures", IEEE, 46th Annual IEEE/IFIP International Conference on Dependable Systems and Networks, Jun. 28, 2016, pp. 97-108 (12 pages total).

\* cited by examiner

| Dataset | | | |
|---|---|---|---|
| Date | Time | PRB Utilization | |
| | | NE A | NE B |
| 15-Oct | 04:30 | 57 | 44 |
| 15-Oct | 04:45 | 33 | 42 |
| 15-Oct | 05:00 | 52 | 38 |
| 15-Oct | 05:15 | 45 | 31 |
| 15-Oct | 05:30 | 64 | 37 |
| 16-Oct | 04:30 | 58 | 31 |
| 16-Oct | 04:45 | 61 | 29 |
| 16-Oct | 05:00 | 63 | 26 |
| 16-Oct | 05:15 | 66 | 24 |
| 16-Oct | 05:30 | 69 | 21 |
| | | | |

METHODS AND SYSTEMS FOR RECOVERY OF NETWORK ELEMENTS IN A COMMUNICATION NETWORK

CROSS-REFERENCE TO RELATED APPLICATION

This application is based on and claims priority under 35 U.S.C. § 119 to Indian Patent Application No. 201941019922 (provisional specification), filed on May 20, 2019, and Indian Patent Application No. 201941019922 (complete specification), filed on Mar. 23, 2020, in the Indian Patent Office, the disclosures of which are incorporated by reference herein in their entirety.

BACKGROUND

1. Field

The disclosure relates to management of network elements of a communication network, and particularly management of a plurality of network elements in the event of a network outage in the communication network.

2. Description of Related Art

Communication networks may be implemented by telecom service providers to provide various communication services to users. Examples of the communication services may include, but are not limited to, voice calling, Voice over Internet Protocol (VoIP) calls, data related services, navigation services, and multimedia services. The communication services may be used by the users using corresponding User Equipment (UE). Non-limiting examples of the UE may include but are not limited to a smartphone, a laptop, a tablet, and smart watch.

To render the communication services to the UE, the communication networks may include a plurality of Network Elements (NEs). Examples of the NEs may include, but are not limited to an Evolved Node B (eNB), a small cell, customer premises equipment, such as routers, switches, set-top boxes, internet access gateways, networking adapters and IoT devices. A NE may provide the communication services to a plurality of UEs communicatively coupled thereto.

The maintenance and management of the NEs may be performed by a Network Management System (NMS) present in the communication network. Amongst other functions, the NMS may be configured to provide configuration settings to the NEs using which the NEs operate. Such configuration settings may be provided by the NMS to an NE, for example, during initial registration with the communication network or at a later point in time when the NE reboots.

As a part of network maintenance operations or due to unforeseen reasons, a network outage may occur. The network outage may be understood as a scenario where a plurality of NEs may be rebooted. As may be understood, due to the network outage, the network services being provided to the UE get disrupted as the corresponding NEs are rebooted.

Subsequent to the outage, the NEs that are rebooted may transmit service requests to the NMS for obtaining the corresponding configuration settings so as to resume rendering of services to the UE coupled to the NEs. However, existing protocols may cause the requests to be processed by the NMS without taking into consideration, the relative impact of the outage on the UEs. For instance, it may be pertinent that services of NEs providing services to an area, such as a hospital are resumed at the earliest.

Therefore, there exists a need to overcome the aforementioned problem.

SUMMARY

Provided are a method and system for recovering a plurality of network elements from a network outage.

Additional aspects will be set forth in part in the description which follows and, in part, will be apparent from the description, or may be learned by practice of the presented embodiments.

In accordance with an aspect of the disclosure, a method of recovering a plurality of network elements from a network outage includes receiving, at a network management system (NMS), a plurality of recovery requests from the plurality of network elements; determining, by the NMS, a sequence for processing the plurality of recovery requests based on a plurality of priority values associated with the plurality of network elements, wherein a priority value of the plurality of priority values is based on at least one key performance indicator (KPI) associated with a corresponding network element of the plurality of network elements; and recovering the plurality of network elements based on the determined sequence.

The method may further include determining the plurality of priority values based on the at least one KPI and a machine learning technique. The machine learning technique may be at least one of a recurrent neural network (RNN) technique, a feed-forward neural network technique, a long short-term memory (LSTM) neural network technique, a supervised learning technique, an un-supervised learning technique, or a linear regression technique.

The priority value may be further determined based on a number of User Equipment (UE) connected to the corresponding network element and an offset value associated with the corresponding network element, wherein the offset value represents a special status of the corresponding network element.

The plurality of priority values may be determined before the plurality of recovery requests is received from the plurality of network elements.

The plurality of priority values may be determined after the plurality of recovery requests is received from the plurality of network elements.

The determining of the sequence may include ascertaining, by the NMS, the priority value based on a unique identifier of the corresponding network element, and a prioritization database, and the prioritization database may include the plurality of priority values associated with the plurality of network elements.

In accordance with an aspect of the disclosure, a network management system (NMS) includes a device communicator configured to receive a plurality of recovery requests from a plurality of network elements; a priority engine configured to process the plurality of recovery requests based on a plurality of priority values associated with the plurality of network elements, wherein a priority value of the plurality of priority values is based on at least one network parameter of a plurality of network parameters associated with the plurality of network elements; a prioritization database configured to store the plurality of priority values associated with the plurality of network elements; and a recovery module configured to recover the plurality of network elements based on a recovery sequence corresponding to the plurality of priority values.

The priority engine may be further configured to determine the plurality of priority values based on the at least one KPI and a machine learning technique. The machine learning technique may be at least one of a recurrent neural network (RNN) technique, a feed-forward neural network technique, a long short-term memory (LSTM) neural network technique, a supervised learning technique, an unsupervised learning technique, or a linear regression technique.

The priority engine may be further configured to determine the priority value based on a number of User Equipment (UE) connected to a corresponding network element of the plurality of network elements and an offset value associated with the corresponding network element, wherein the offset value represents a special status of the corresponding network element.

The priority engine may be further configured to determine the plurality of priority values before the plurality of recovery requests is received from the plurality of network elements.

The priority engine may be further configured to determine the plurality of priority values after the plurality of recovery requests is received from the plurality of network elements.

The priority engine may be further configured to ascertain the priority value based on a unique identifier of a corresponding network element of the plurality of network elements, and the prioritization database.

In accordance with an aspect of the disclosure, a method for network outage recovery management for a plurality of Network Elements (NEs) connected to a Network Management System (NMS) includes detecting, by the NMS, a plurality of network parameters of the plurality of NEs; determining, by the NMS, a plurality of priority values corresponding to the plurality of NEs; storing, by the NMS, the determined plurality of priority values; receiving, by the NMS, a plurality of configuration requests from the plurality of NEs based on a network outage occurring; processing, by the NMS, the received plurality of configuration requests in an order corresponding to the stored plurality of priority values; and recovering, by the NMS, the plurality of NEs based on the order corresponding to the stored plurality of priority values.

The NMS may include a prioritization engine configured to determine the plurality of priority values; a prioritization database configured to store the plurality of priority values and the plurality of network parameters; and a recovery module configured to order the recovering of the plurality of NEs based on the plurality of priority values stored in the prioritization database.

In accordance with an aspect of the disclosure, a method for network outage recovery management includes receiving, by a plurality of network elements (NEs) a plurality of connection requests from a plurality of user equipment (UEs) based on a network outage occurring; sending a plurality of configuration requests from the plurality of NEs to a network management system (NMS); prioritizing the plurality of configuration requests by the NMS based on a set of priority rules; processing, by the NMS, the prioritized plurality of configuration requests to generate a plurality of prioritized responses; activating network services on the plurality of NEs by sending the generated plurality of prioritized responses by the NMS to the plurality of NEs; and serving the plurality of connection requests of the plurality of UEs by the plurality of NEs on which the network services are activated.

BRIEF DESCRIPTION OF THE DRAWINGS

The above and other aspects, features, and advantages of certain embodiments of the present disclosure will be more apparent from the following description taken in conjunction with the accompanying drawings, in which.

Further, skilled artisans will appreciate that elements in the drawings are illustrated for simplicity and may not have been necessarily been drawn to scale. For example, the flow charts illustrate the method in terms of the most prominent steps involved to help to improve understanding of embodiments. Furthermore, in terms of the construction of the device, one or more components of the device may have been represented in the drawings by conventional symbols, and the drawings may show only those specific details that are pertinent to understanding the embodiments so as not to obscure the drawings with details that will be readily apparent to those of ordinary skill in the art having benefit of the description herein.

DETAILED DESCRIPTION

Reference will now be made to embodiments illustrated in the drawings and specific language will be used to describe the same. It will nevertheless be understood that no limitation of the scope of the disclosure is thereby intended, such alterations and further modifications in the illustrated system, and such further applications of the principles as illustrated therein being contemplated as would normally occur to one skilled in the art to which the invention relates.

It will be understood by those skilled in the art that the foregoing general description and the following detailed description are explanatory and are not intended to be restrictive.

Reference throughout this specification to "an aspect", "another aspect" or similar language means that a particular feature, structure, or characteristic described in connection with the embodiment is included in at least one embodiment. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Expressions such as "at least one of a, b, and c" should be understood as including only a, only b, only c, both a and b, both a and c, both b and c, all of a, b, and c, or other variations of thereof.

Unless otherwise defined, all technical and scientific terms used herein have the same meaning as commonly understood by one of ordinary skilled in the relevant art. The system, methods, and examples provided herein are illustrative only and not intended to be limiting.

For the sake of clarity, the first digit of a reference numeral of each component of the present disclosure is generally indicative of the figure number, in which the corresponding component is shown. For example, reference numerals starting with digit "1" are shown at least in FIG. 1. Similarly, reference numerals starting with digit "2" are shown at least in FIG. 2, and so on and so forth.

Embodiments of the present subject matter are described below in detail with reference to the accompanying drawings.

Figure 1:
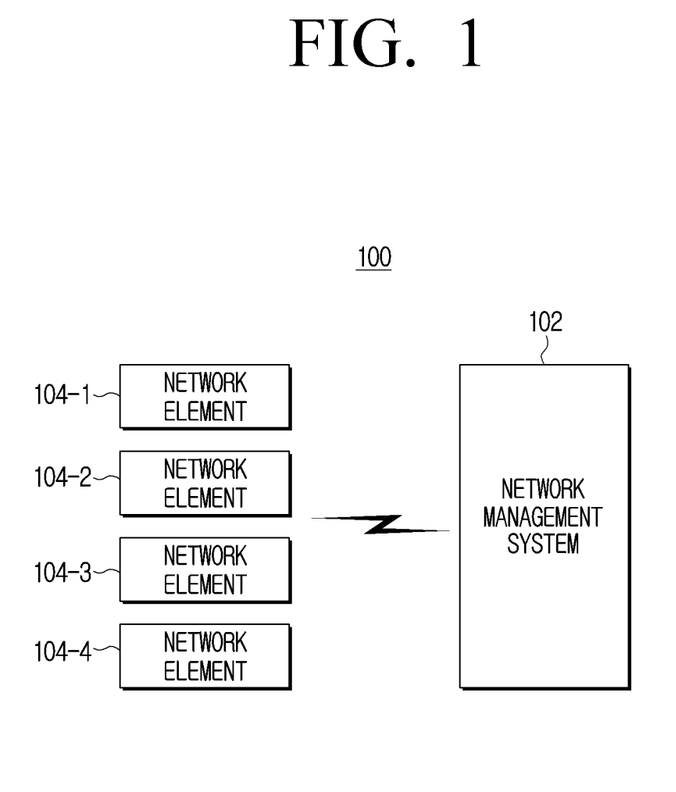
FIG. 1 illustrates a network environment depicting an interaction between a network management system (NMS) and a number of network elements, according to an embodiment.
Figure 2A:
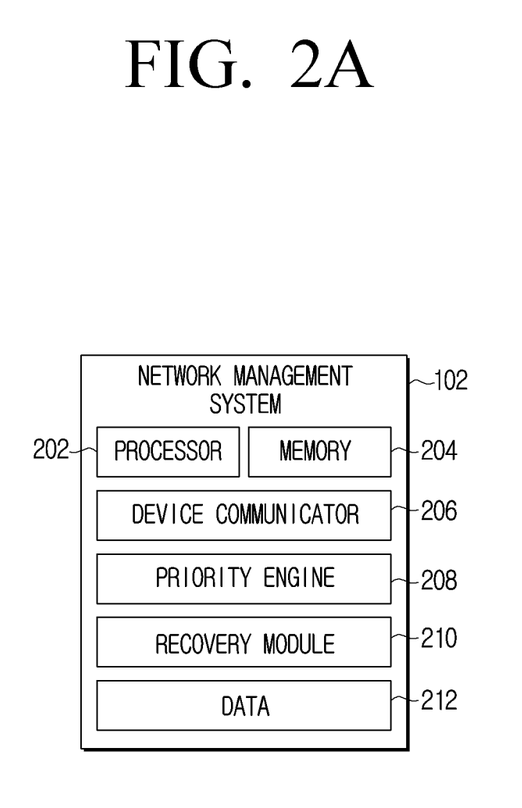
FIG. 2A illustrates a schematic block diagram of the network management system (NMS) for recovering the network elements, according to an embodiment.

FIG. 1 illustrates a network environment 100 implementing a network management system (NMS) 102, according to an example embodiment. The network environment 100 may be a communication network implemented by a service provider for providing a plurality of communication related services to mobile subscribers through corresponding User Equipment (UE). Examples of the communication network may include but are not limited to a second generation (2G) network, a third generation (3G) cellular network, such as a Global System for Mobile (GSM) cellular network, an Enhanced Data rates for GSM Evolution 25 (EDGE) cellular network, a Universal Terrestrial Radio Access Network (UTRAN), a Code Division Multiple Access (CDMA) 2000 cellular network, and so on and so forth. In further examples, the communication network may be a new generation radio (NR), a fifth generation (5G) or cellular networks beyond the aforementioned. Examples of the communication related services may include, but are not limited to, voice calls, Voice over Internet Protocol (VoIP) calls, data related services, and multimedia services.

In an example, the network environment 100 may include the NMS 102 and one or more network elements 104, for example network element 104-1, network element 104-2, network element 104-3, and network element 104-4. Amongst other things, the NMS 102 may be configured to maintain and manage the operations of the network elements 104. In an example, a network element 104 may be understood as a device capable of providing network-related communication services to the mobile subscribers through corresponding UE. Examples of the network elements 104 may include, but are not limited to, an Evolved Node B (eNB), a small cell, a 5G Access Unit, a Customer-Premises Equipment (CPE), an IOT device, a router, a Wi-Fi access point, and the like.

In an example, the NMS 102 may be configured to recover the one or more network elements 104 in the event of a network outage occurring in the network environment 100. In an example, the network outage may be a planned or a scheduled outage. For instance, the network elements 104 may be taken out of operation by the service provider for the purposes of software upgrades, maintenance, etc. In another example, the network outage may be an unplanned outage occurring due to unforeseen issues associated with the network elements 104. Unforeseen issues may include power outages, core equipment damage due to harsh weather conditions such as storms, cyclones, tsunami, thunderstorms, power grid failures, and the like.

As mentioned above, the NMS 102 manages the recovery of the number of network elements 104 in the event of a network outage. In an example, upon occurrence of the network outage, the NMS 102 may receive a plurality of recovery requests from the one or more network elements 104 for recovering the one or more network elements 104 from the network outage. As used herein, the term recovery request may be understood as a communication message transmitted by a network element 104 to the NMS 102 for recovery of the network element 104. The recovery request may be any form of communication message suitable to the communication protocol existing between the network element 104 and the NMS 102, and supported by the network environment 100. Upon receiving the recovery requests, the NMS 102 may determine a sequence in which the recovery requests are to be processed. In other words, the NMS 102 may determine a sequence in which the one or more network elements 104 are to be recovered.

In an example, the sequence may be determined based upon a plurality of priority values associated with the plurality of network elements 104. In said example, each of the plurality of priority values may be based on at least one key performance indicator (KPI) associated with the corresponding network elements 104. Each of the KPIs comprises or represents a corresponding value associated with the performance of the network elements 104. Examples of the KPIs may include, but are not limited to, a physical resource block utilization, a number of ping pong voice call handovers, a number of ping pong data handovers, a download throughput, an upload throughput, a session time for voice connection, a session time for data connection, a number of connections attempted, a number of connections successfully established, a call drop rate, a number of intra-handover attempts, a number of intra-handovers that are successful, a number of inter handover attempts, a number of inter handovers that are successful, a number of times preamble is sent (related to number of devices in vicinity), a duration of volte calls, a count of volte calls, a count of muted volte calls, a mute time for end user in volte call, a volte quality defects detected, a number of incoming volte handovers, an active voice subscriber (UE) count—downlink, an active data subscriber (UE) count—downlink, an active voice subscriber (UE) count—uplink, an active data subscriber (UE) count—uplink, or the like.

In an example, the NMS 102 may be configured to determine the priority values based on the KPIs associated with the corresponding network elements 104. To that end, the NMS 102 may collect or obtain the KPIs associated with the network elements 104. In an example, the NMS 102 may collect the KPIs after periodic intervals. In another example, the NMS 102 may collect the KPIs in near to real time upon receipt of the recovery requests from the network elements 104. In an example, the priority values determined by the NMS 102 may be stored in data storage, such as a database, communicatively coupled to the NMS 102.

In an example, the sequence may be determined based on an order of the priority values. For instance, the sequence may be based on a descending order of priority values. Once the sequence is determined, the NMS 102 recovers the one or more network elements 104 from the network outage based on the determined sequence of recovery.

The above described embodiments of recovering the network elements 104 from the network outage based on the number of priority values provides with a number of advantages. For example, prioritized resumption of communication services to UE which are located at pertinent locations, such as hospitals, police stations, etc., may be provided. Furthermore, in other non-limiting examples, services to a network element 104 that may be rendering important or critical services may be resumed earlier, thereby aiding in quicker resumption of such critical services. Furthermore, in other non-limiting examples, a network element 104 that may be rendering services to high number of UE may be recovered first, thereby improving the UE experience of users using the communication services.

FIG. 2A illustrates a schematic block diagram of the NMS 102 for recovering the network elements 104 from a network outage, according to an embodiment. In an example, the NMS 102 includes a processor 202, memory 204, a device communicator 206, a priority engine 208, a recovery module 210, and data storage 212. In an example, the processor 202, the memory 204, the device communicator 206, the priority engine 208, the recovery module 210, and the data storage 212 may be communicatively coupled to one another. In the illustrated embodiment, the device communicator 206, the priority engine 208, and the recovery module 210 are shown to be incorporated within the NMS 102. Accordingly, the NMS 102 may function or may be implemented as a single entity. As would be appreciated, one or more of the aforementioned components of the NMS 102 may be implemented in a distributed manner, as separate entities within the network environment 100.

In FIG. 2A, each of the device communicator 206, the priority engine 208, and the recovery module 210 may be implemented as software or hardware, or combination of software and hardware. Each of the device communicator 206, the priority engine 208, and the recovery module 210 may be controlled through the processor 202.

The processor 202 may be a single processing unit or a number of units, all of which could include multiple computing units. The processor 202 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 202 may be configured to fetch and/or execute computer-readable instructions and/or data (e.g., the Service data) stored in the memory 204.

The memory 204 may include any non-transitory computer-readable medium known in the art including, for example, volatile memory, such as static random access memory (SRAM) and/or dynamic random access memory (DRAM), and/or non-volatile memory, such as read-only memory (ROM), erasable programmable ROM (EPROM), flash memory, hard disks, optical disks, and/or magnetic tapes. The memory 204 may include the data storage 212.

In an example, the device communicator 206, the priority engine 208, the recovery module 210, amongst other things, include routines, programs, objects, components, data structures, etc., which perform particular tasks or implement data types. The device communicator 206, the priority engine 208, the recovery module 210 may also be implemented as, signal processor(s), state machine(s), logic circuitries, and/or any other device or component that manipulate signals based on operational instructions. Further, the device communicator 206, the priority engine 208, the recovery module 210 can be implemented in hardware, instructions executed by a processing unit, or by a combination thereof. The processing unit can include a computer, a processor, such as the processor 202, a state machine, a logic array or any other suitable devices capable of processing instructions. The processing unit can be a general-purpose processor which executes instructions to cause the general-purpose processor to perform the required tasks or, the processing unit can be dedicated to perform the required functions.

The data storage 212 serves, amongst other things, as a repository for storing data processed, received, and generated by one or more of the processor 202, the device communicator 206, the priority engine 208, and the recovery module 210. In an example, the data storage 212 may further include data received from or data related to the network elements 104. For instance, each of the network elements 104 that are registered with the NMS 102 may be given a unique identifier (ID) which may be stored in a database in the data storage 212. The database in which the unique ID is stored may be referred to as a prioritization database. Furthermore, the data storage 212 may include the KPI values associated with the network elements 104. As may be understood, such KPI values may be mapped with the respective unique IDs of the network elements 104 and may be stored in the prioritization database and/or another database in the data storage 212. The KPI values may be either obtained by the NMS 102 periodically or based on the occurrence of an event. Without limitation, the event herein may include occurrence of a network outage or receipt of an input from a network administrator. Furthermore, in a non-limiting example, the data storage 212 may include a plurality of priority values corresponding to the network elements 104, as will be explained in greater detail below. In a non-limiting example, a priority value of a network element 104 may be understood as data indicative of a rank of the network element 10 in comparison to other network elements 104. As an example, the priority value may include, but is not limited to, a numerical value, an alphanumeric value, and the like.

In an example embodiment, the NMS 102 may be configured to recover the network elements 104 in the event of a network outage. As mentioned above, the network outage may be one of a scheduled network outage or an unplanned network outage. After the occurrence of the network outage, in an example, the device communicator 206 of the NMS 102 may be configured to receive a plurality of recovery requests from the network elements 104. In an example, the recovery requests received by the device communicator 206 may be stored in the data storage 212, from where it may be obtained by any of the aforementioned components of the NMS 102.

Accordingly, in an example, the priority engine 208 may be configured to obtain or fetch the recovery requests from the data storage 212 and determine a sequence in which the recovery requests are to be processed for recovering the network elements 104. In an example, the priority engine 208 may determine the sequence based upon a plurality of priority values associated with the network elements 104. To this end, the priority engine 208 may obtain the priority values associated with the network elements 104 from the data storage 212 to determine the sequence.

In an example embodiment, the priority engine 208 may be configured to determine the priority values associated with the network elements 104 based on corresponding KPI values associated with the network elements 104. In an example, the priority values may be determined periodically. In another example, the priority values may be determined relative to the occurrence of the network outage. That is, in an example where the network outage is planned, the priority engine 208 may itself calculate the priority values based on the latest available KPIs associated with the network elements 104. In another example, the priority engine 208 may calculate the priority values on learning about the receipt of the recovery requests, for example after the outage has occurred. Again, in said case, the priority engine 208 may either calculate the priority values based on the latest available KPIs associated with the network elements 104 or may again obtain the KPIs in near to real-time and then calculate the priority values.

In an example, the priority engine 208 may determine the priority values based on at least one of the KPI values and a machine learning technique. An example of the determination of the priority value is described below.

In an example, the priority engine 208 may determine a priority value of a network element, for example the network element 104-1, based on at least one KPI value associated with the network element 104-1 and Equation 1 provided below.

$$Pr(i, t) = k1 \times \left( \frac{\sum_{t'=t-30, n=0}^{t+30, N} S(i, t', n)}{\sum_{t'=t-30, n=0}^{t+30, N} 1} \right) + k2 \times Cap(i) + C_i \quad \text{(Equation 1)}$$

In the equation 1 above, Pr(i,t) is the priority value and i is the network element 104 and t is the point of time at which the priority value is determined.

Further, the Cap(i) is the capacity of the network element 104-1 and S(i,t', n) is the at least one of the key performance indicators (KPIs) associated with the network element 104-(*i*) at the time t. The capacity depicts a number of UE connected to each of the network elements 104-1, in an example. In other non-limiting examples, the capacity may represent a maximum UE connections allowed or a maximum bandwidth/throughput/speed that can be provided by network element 104 or coverage area/range of transmission of network element 104, and the like. The UE can be any devices receiving network/communication services from the network elements 104-1. Equation 1 further includes k1 and k2 as constant values. The Equation 1 further includes an offset $C_i$ to increase the priority value of the network element 104. The offset can be a flag or a bookmark to ensure the network element 104 providing network services to the UE at important locations such as hospitals, airports, government offices or the like is recovered earlier than the other network elements 104. Thus, the offset value represents a special status of the network element. An example of the determination of the priority value is described below with reference to FIG. 2B.

Figure 2B:
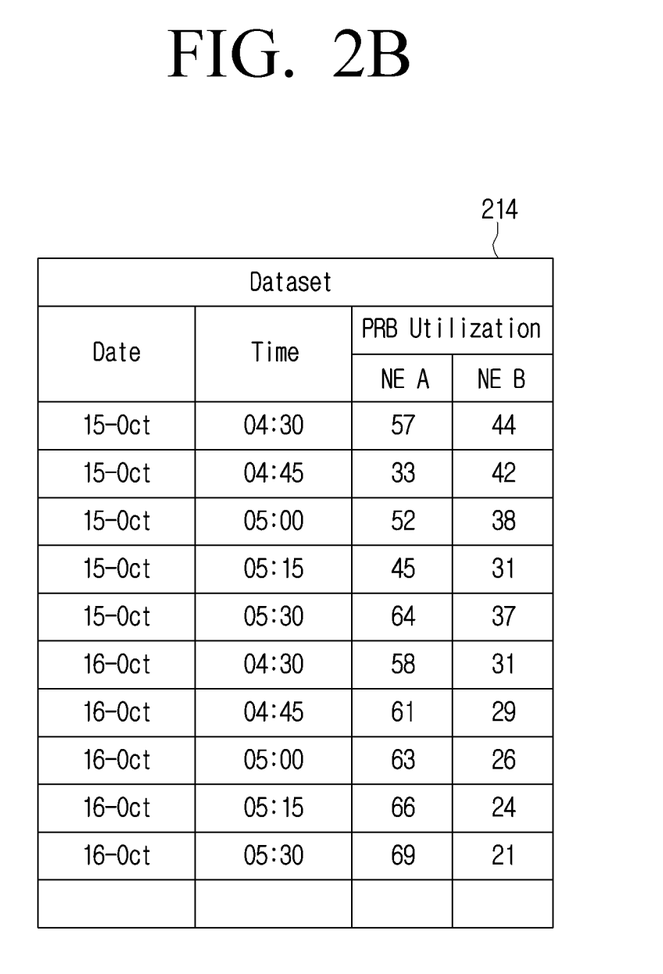
FIG. 2B illustrates an example reference for recovering the network elements, according to an embodiment.

FIG. 2B illustrates an example dataset 214 including KPI values associated with two network elements, such as the network elements 104, according to an embodiment of the present subject matter. As shown, the dataset 214 includes values for a KPI "PRB Utilization" corresponding to a network element A (NE A) and a network element B (NE B), for different time instances.

In an example, the above illustrated equation 1 may be used for determining the priority values of two of the network elements 104, referred to here as "NE A" and "NE B". In said example, the priority engine 208 utilizes the PRB utilization value of the NE A and the NE B for determining their respective priorities. In the present example embodiment, the PRB utilization value of the two of the network elements 104 is calculated after every 15 minutes for calculating the priority values for the network elements 104 for the network outage at a particular point of time on a specific date. The priority engine 208 collects value of the physical resource block utilization of the two of the network elements 104 for previous two days and at two different point of time 15 minutes prior to the particular point of time. Accordingly, the priority value is calculated as shown in Equation 2 and Equation 3 below.

$$Pr(NEA, 05:00) = \left( \frac{\sum_{t'=04:30, n=15\text{-}Oct}^{05:30, 16\text{-}Oct} PRB(NEA, t', n)}{\sum_{t'=04:30, n=15\text{-}Oct}^{05:30, 16\text{-}Oct} 1} \right) = \quad \text{(Equation 2)}$$

$$\frac{57 + 33 + 52 + 45 + 64 + 58 + 61 + 63 + 66 + 69}{10} = 56.8$$

$$Pr(NEB, 05:00) = \left( \frac{\sum_{t'=04:30, n=15\text{-}Oct}^{05:30, 16\text{-}Oct} PRB(NEB, t', n)}{\sum_{t'=04:30, n=15\text{-}Oct}^{05:30, 16\text{-}Oct} 1} \right) = \quad \text{(Equation 3)}$$

$$\frac{44 + 41 + 38 + 31 + 37 + 31 + 29 + 26 + 24 + 21}{10} = 32.3$$

Thus, the priority engine 208 may determine the priority values corresponding to the network elements 104, as described above. As mentioned above, the sequence in which the recovery requests are to be processed may be determined based on the priority values. In an example, the priority engine 208 may determine the sequence such that the network elements 104 are arranged based on a descending order of the priority values, or in any other manner as desired.

In an example, the priority engine 208 may store the sequence in the data storage 212. In an example, the sequence may be stored in the prioritization database and/or any other database in the data storage 212. Accordingly, in the event of a network outage, the priority engine 208 may transmit the determined sequence to the recovery module 210. The recovery module 210 is capable of recovering the network elements 104 from the network outage. To that end, in an example, the recovery module 210 may transmit respective reboot configurations to the network elements 104. According to aspects of the present subject matter, the recovery module 210 recovers the network elements 104 on the basis of the determined sequence provided by the priority engine 208. That is, the reboot configurations may be transmitted to the network elements 104 based on the order defined in the sequence.

Figure 3:
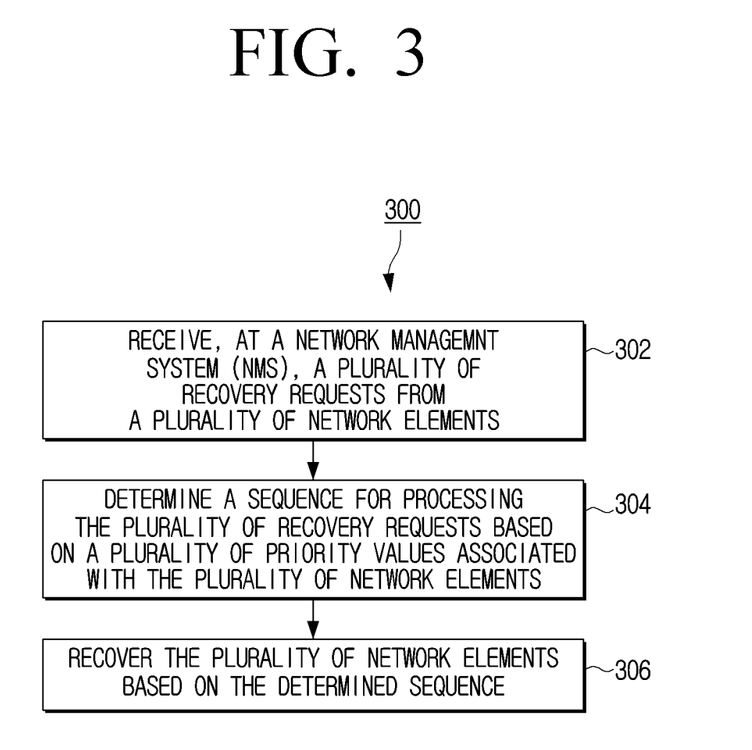
FIG. 3 illustrates a flow diagram of a method of recovering a plurality of network elements from a network outage, according to an embodiment.

FIG. 3 illustrates a flow diagram of a method 300 of recovering the network elements 104 from a network outage, in accordance with the embodiment. The method 300 may be implemented by the NMS 102 using components thereof, as described above. In an embodiment, the method 300 may be executed by the device communicator 206, the priority engine 208 and the recovery module 210. Further, for the sake of brevity, details of the present disclosure that are explained in details in the description of FIG. 1 and FIG. 2 are not explained in detail in the description of FIG. 3.

At operation 302, the method 300 includes receiving, at an NMS, a plurality of recovery requests from a plurality of network elements. In an example, the recovery requests may be received in the event of a network outage. The recovery requests may be for recovery of the network elements from the network outage and resumption of network services. In an example, the device communicator 206 of the NMS 102 receives the recovery requests from the network elements 104.

At operation 304, the method 300 includes determining a sequence for processing the recovery requests based on a plurality of priority values associated with the network elements. The priority value associated with a network element may be based on at least one KPI associated with the network elements. In an example, the priority value may be determined based on the at least one KPI and a machine learning technique. In a further example, the determination of the priority value may be further based on an offset value associated with the corresponding network element, wherein the offset value depicts a special status of the network element. In an example, a time at which the plurality of priority values is determined may be earlier than a time at which the plurality of recovery requests is received from the plurality of network elements. In an example, a time at which the plurality of priority values is determined may be later than a time at which the plurality of recovery requests is received from the plurality of network elements. As mentioned above, the priority values may be stored in a prioritization database. Accordingly, the method 300 may include ascertaining, by the NMS, a priority value of each of the plurality of network elements based on a corresponding unique ID of each of the plurality of network elements and the prioritization database. Herein, the prioritization database may include a plurality of priority values associated with the plurality of network elements. In an example, the priority engine 208 may be configured to determine the priority values and the sequence as explained above in the description of FIG. 2.

At operation 306, the method 300 includes recovering the network elements from the network outage based on the determined sequence. In an example embodiment, the network elements may be recovered from the network outage based on the sequence. For instance, the sequence may include a list of the network elements arranged in a descending order of their respective priority values. Accordingly, the recovery requests may be processed based on the order of the list of network elements. In an example, the recovery module 210 recovers the network elements 104 based on the sequence.

Figure 4:
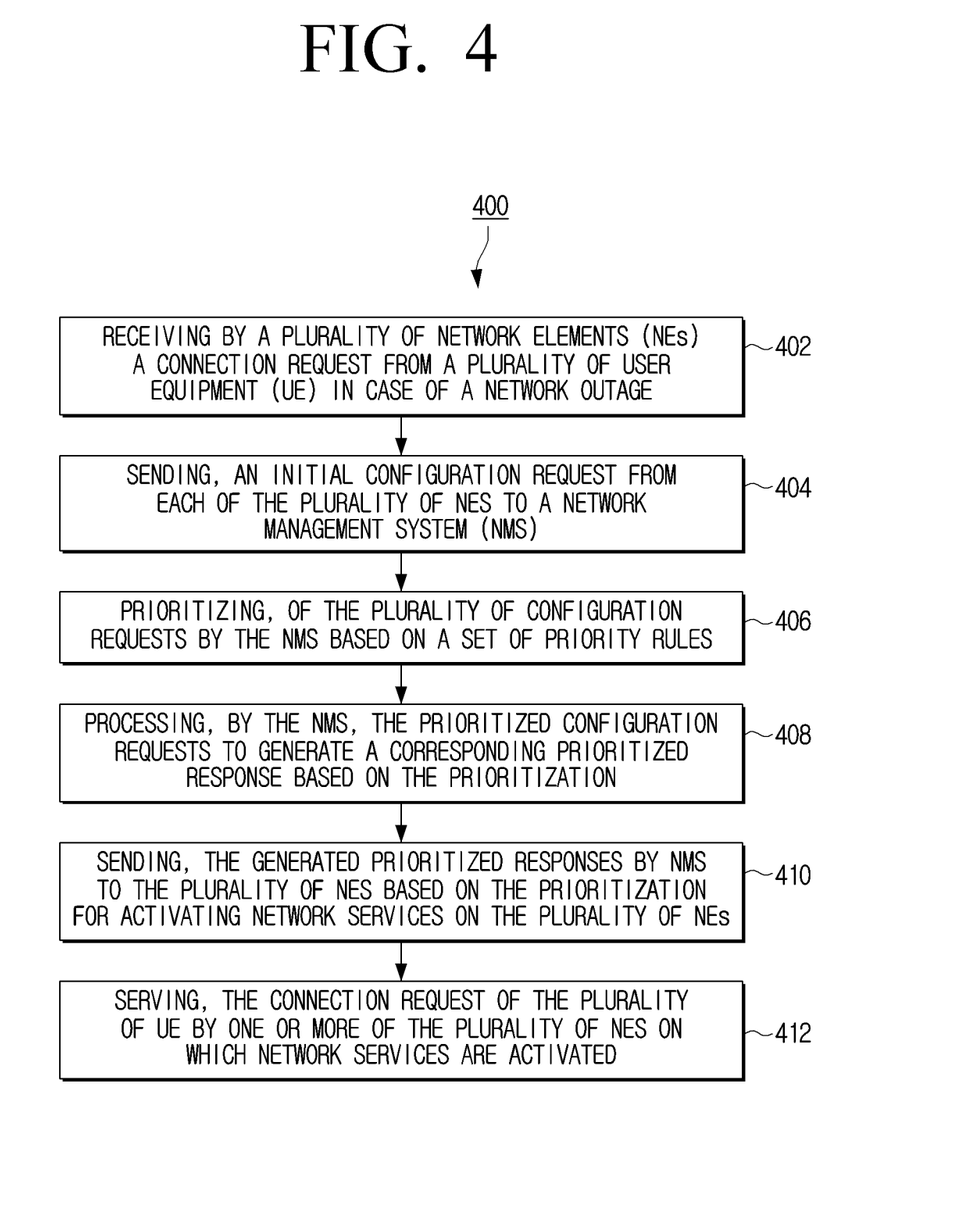
FIG. 4 illustrates a flow diagram of a method 400 for network outage recovery management, according to an embodiment.

FIG. 4 illustrates a flow diagram of a method 400 for network outage recovery management. For the sake of brevity, details of the present disclosure that are explained in detail in the description of FIG. 1, FIG. 2, and FIG. 3 are not explained in detail in the description of FIG. 4.

At operation 402, the method 400 includes receiving, by a number of network elements (NEs), a connection request from a number of user equipment (UE) in case of network outage. In one example embodiment, the connection request may be the recovery request described in the previous embodiments. In an example, the network elements 104 may receive the connection request from the UE.

At operation 404, the method 400 includes sending an initial configuration request from each of the number of NEs to a network management system (NMS). The NMS may be configured to maintain and manage the operations of the network elements. In an example, the network elements 104 may send the initial configuration request to the NMS 102.

At operation 406. The method 400 includes prioritization, of the plurality of configuration requests by the NMS based on a set of priority rules. In an example, the NMS 102 may prioritize the plurality of configuration requests.

At operation 408, the method 400 includes processing by the NMS, the prioritized configuration requests to generate a corresponding prioritized response based on the prioritization. In an example, the NMS 102 may process the prioritized configuration requests.

At operation 410, the method 400 includes sending the generated prioritized responses by NMS to the plurality of NEs based on the prioritization for activating network services on the plurality of NEs. In an example, the NMS 102 may send the prioritized responses to the plurality of NEs 104.

At operation 412, the method 400 includes serving the connection request of the plurality of UEs by one or more of the plurality of NEs on which network services are activated. In an example, one or more of the NEs 104, on which network services are activated, may serve the connection requests of the plurality of UEs.

Figure 5:
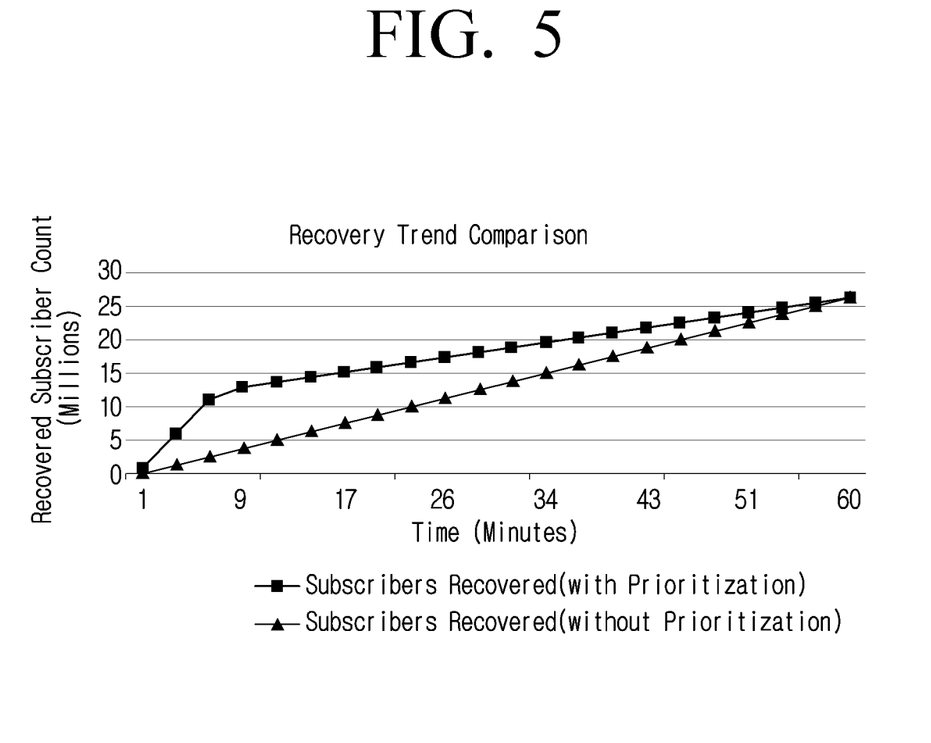
FIG. 5 illustrates a comparison of recovery trends for an exemplary network of one million devices, with and without prioritization, according to an embodiment.

FIG. 5 illustrates a comparison of recovery trends for an exemplary network of one million devices, with and without prioritization. In the example of FIG. 5, a total number of devices may be 1 million devices, a number of enterprise devices (for example, with a capacity of 256) may be 100,000 devices, a number of residential devices (for example, with a capacity of 32) may be 900,000 devices, and a priority rule that is used may be based on device capacity.

Based on the above sample, it was determined that an average recovery time for a subscriber without prioritization may be approximately 30 minutes, and an average recovery time for a subscriber with prioritization may be approximately 19 minutes.

Figure 6A:
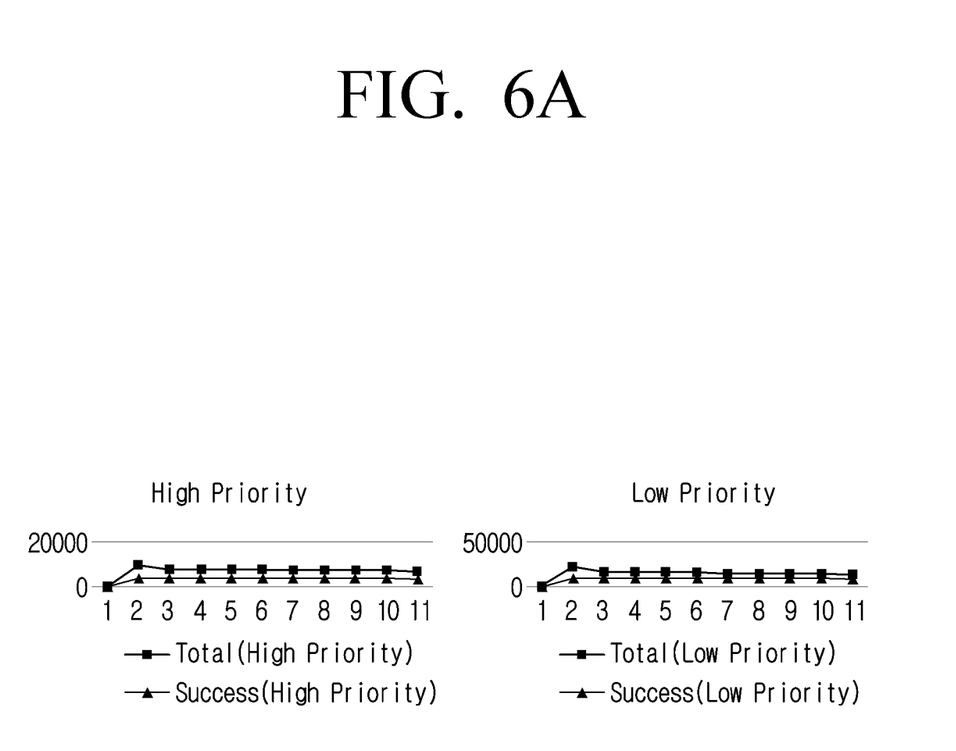
FIGS. 6A and 6B illustrate comparison of recovery rates for the exemplary network of FIG. 5, according to embodiments.
Figure 6B:
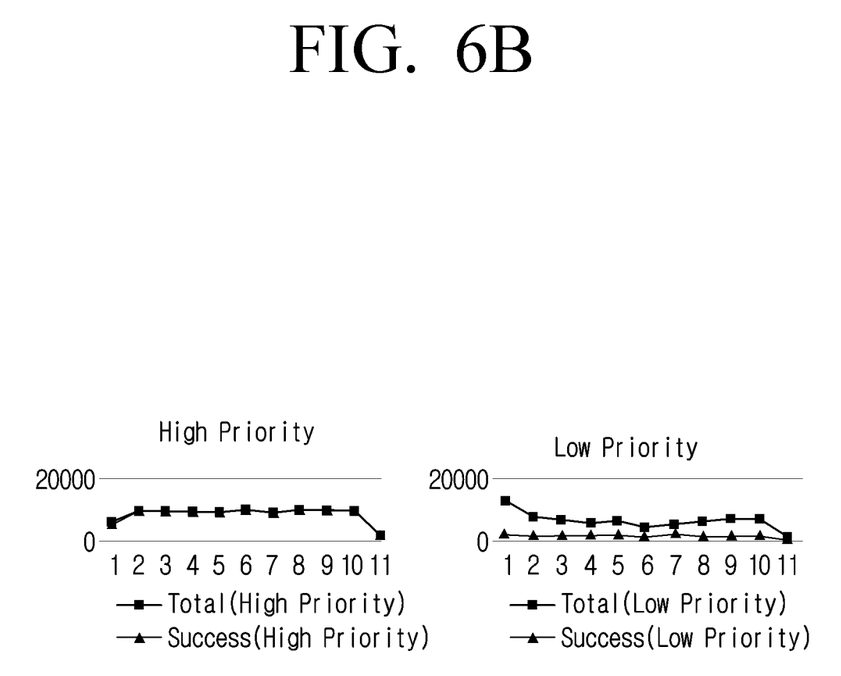

FIGS. 6A and 6B illustrate comparison of recovery rates for the exemplary network of FIG. 5. The simulation results illustrate that prioritization significantly improves the recovery rate of high priority devices to near 100% resulting in minimal down time for all the subscribers connected to those devices. It can be additionally seen that impact on overall recovery rate is minimal.

FIG. 6A illustrates a pattern for request success and failure for two types of devices in a normal case. It can be seen that the rate of success is roughly the same. FIG. 6B illustrates a pattern for request success and failure for the two types of devices when prioritization is applied. Here, the success rate of high priority devices is significantly higher than that of low priority device.

While specific language has been used to describe the present disclosure, any limitations arising on account thereto, are not intended. As would be apparent to a person in the art, various working modifications may be made to the method in order to implement the embodiments as taught herein. The drawings and the foregoing description give examples of embodiments. Those skilled in the art will appreciate that the described elements may well be combined into a single functional element. Alternatively, certain elements may be split into multiple functional elements. Elements from one embodiment may be added to another embodiment. The present disclosure may be otherwise variously embodied, and practiced within the scope of the following claims.

What is claimed is:

1. A method of recovering a plurality of network elements from a network outage, the method comprising:
receiving, at a network management system (NMS), a plurality of recovery requests from the plurality of network elements;
determining, by the NMS, a sequence for processing the plurality of recovery requests based on a plurality of priority values associated with the plurality of network elements, wherein a priority value of the plurality of priority values is based on at least one key performance indicator (KPI) associated with a performance of the plurality of network elements and capacity information including information regarding a maximum number of user terminals respectively connected to the plurality of network elements; and
recovering the plurality of network elements based on the determined sequence,
wherein the priority value is further determined based on a flag indicating that a corresponding network element has a preferential status with respect to the plurality of network elements.

2. The method according to claim 1, further comprising determining the plurality of priority values based on the at least one KPI and a machine learning technique.

3. The method according to claim 2, wherein the priority value is further determined based on a number of User Equipment (UE) connected to the corresponding network element, and
wherein the flag indicates an offset value associated with the corresponding network element, wherein the offset value represents the preferential status of the corresponding network element.

4. The method of claim 3, wherein the flag indicates that the corresponding network element is associated with at least one from among a hospital, an airport, or a government office.

5. The method according to claim 2, wherein the plurality of priority values are determined before the plurality of recovery requests is received from the plurality of network elements.

6. The method according to claim 2, wherein the plurality of priority values are determined after the plurality of recovery requests is received from the plurality of network elements.

7. The method according to claim 1, wherein the determining of the sequence comprises ascertaining, by the NMS, the priority value based on a unique identifier of the corresponding network element, and a prioritization database, and
wherein the prioritization database comprises the plurality of priority values associated with the plurality of network elements.

8. The method of claim 1, wherein the capacity information further includes information regarding a maximum bandwidth, throughput and speed of the plurality of network elements, and information regarding a coverage range of transmission of the plurality of network elements.

9. A network management system (NMS) comprising:
at least one processor configured to implement:
a device communicator configured to receive a plurality of recovery requests from a plurality of network elements;
a priority engine configured to process the plurality of recovery requests based on a plurality of priority values associated with the plurality of network elements, wherein a priority value of the plurality of priority values is based on at least one key performance indicator (KPI) associated with a performance of the plurality of network elements and capacity information including information regarding a maximum number of user terminals respectively connected to the plurality of network elements;
a prioritization database configured to store the plurality of priority values associated with the plurality of network elements; and
a recovery module configured to recover the plurality of network elements based on a recovery sequence corresponding to the plurality of priority values,
wherein the priority value is further determined based on a flag indicating that a corresponding network element has a preferential status with respect to the plurality of network elements.

10. The NMS according to claim 9, wherein the priority engine is further configured to determine the plurality of priority values based on the at least one KPI and a machine learning technique.

11. The NMS according to claim 10, wherein the priority engine is further configured to determine the priority value based on a number of User Equipment (UE) connected to the corresponding network element of the plurality of network elements, and
wherein the flag indicates an offset value associated with the corresponding network element, wherein the offset value represents the preferential status of the corresponding network element.

12. The NMS according to claim 10, wherein the priority engine is further configured to determine the plurality of priority values before the plurality of recovery requests is received from the plurality of network elements.

13. The NMS according to claim 10, wherein the priority engine is further configured to determine the plurality of priority values after the plurality of recovery requests is received from the plurality of network elements.

14. The NMS according to claim 9, wherein the priority engine is further configured to ascertain the priority value based on a unique identifier of the corresponding network element of the plurality of network elements, and the prioritization database.

15. A method for network outage recovery management for a plurality of Network Elements (NEs) connected to a Network Management System (NMS), the method comprising:
detecting, by the NMS, a plurality of network parameters of the plurality of NEs;
determining, by the NMS, a plurality of priority values corresponding to the plurality of NEs, wherein a priority value of the plurality of priority values is based on at least one key performance indicator (KPI) associated with a performance of the plurality of NEs and capacity information including information regarding a maximum number of user terminals respectively connected to the plurality of NEs;
storing, by the NMS, the determined plurality of priority values;
receiving, by the NMS, a plurality of configuration requests from the plurality of NEs based on a network outage occurring;
processing, by the NMS, the received plurality of configuration requests in an order corresponding to the stored plurality of priority values; and recovering, by the NMS, the plurality of NEs based on the order corresponding to the stored plurality of priority values, wherein the priority value is further determined based on a flag indicating that a corresponding NE has a preferential status with respect to the plurality of NEs.

16. The method according to claim 15, wherein, the NMS comprises at least one processor configured to implement:
    a prioritization engine configured to determine the plurality of priority values;
    a prioritization database configured to store the plurality of priority values and the plurality of network parameters; and
    a recovery module configured to order the recovering of the plurality of NEs based on the plurality of priority values stored in the prioritization database.

17. A method for network outage recovery management, the method comprising:
    receiving, by a plurality of network elements (NEs) a plurality of connection requests from a plurality of user equipment (UEs) based on a network outage occurring;
    sending a plurality of configuration requests from the plurality of NEs to a network management system (NMS);
    prioritizing the plurality of configuration requests by the NMS based on a set of priority rules;
    processing, by the NMS, the prioritized plurality of configuration requests to generate a plurality of prioritized responses;
    activating network services on the plurality of NEs by sending the generated plurality of prioritized responses by the NMS to the plurality of NEs; and
    serving the plurality of connection requests of the plurality of UEs by the plurality of NEs on which the network services are activated,
    wherein a plurality of priority values corresponding to the plurality of NEs for generating the plurality of prioritized responses is determined based on at least one key performance indicator (KPI) associated with a performance of the plurality of network elements and capacity information including information regarding a maximum number of user terminals respectively connected to the plurality of network elements,
    wherein a priority value of the plurality of priority values is determined based on a flag indicating that a corresponding NE has a preferential status with respect to the plurality of NEs.

* * * * *